US008544719B2

(12) United States Patent
Bettinger

(10) Patent No.: US 8,544,719 B2
(45) Date of Patent: Oct. 1, 2013

(54) CLEAR CLASP REUSABLE ENVELOPE

(75) Inventor: James Edward Bettinger, Shorewood, MN (US)

(73) Assignee: Cenveo Corporation, Stamford, CT (US)

( * ) Notice: Subject to any disclaimer, the term of this patent is extended or adjusted under 35 U.S.C. 154(b) by 277 days.

(21) Appl. No.: 12/896,462

(22) Filed: Oct. 1, 2010

(65) Prior Publication Data
US 2012/0080509 A1   Apr. 5, 2012

(51) Int. Cl.
*B65D 27/14* (2006.01)
(52) U.S. Cl.
USPC ............. 229/80.5; 229/76; 229/80; 229/75
(58) Field of Classification Search
USPC ............ 229/75, 76, 77, 79, 80, 80.5, 81, 229/84, 300, 301
See application file for complete search history.

(56) References Cited

U.S. PATENT DOCUMENTS

| | | | | |
|---|---|---|---|---|
| 884,174 | A | * | 4/1908 | Longtoft ............... 229/82 |
| 1,006,199 | A | * | 10/1911 | Fridrich ............... 229/80 |
| 1,198,288 | A | * | 9/1916 | Taylor, Jr. ............... 229/81 |
| 1,298,473 | A | * | 3/1919 | Dorsett ............... 229/81 |
| 1,375,968 | A | * | 4/1921 | Lattanzio ............... 229/81 |
| 1,791,352 | A | | 2/1931 | Colonnese |
| 1,974,339 | A | | 9/1934 | McDonald |
| 2,066,495 | A | * | 1/1937 | Swift ............... 229/80 |
| 2,133,946 | A | * | 10/1938 | Bloomer ............... 229/246 |
| 2,270,305 | A | * | 1/1942 | Juul ............... 229/81 |
| 2,329,055 | A | * | 9/1943 | Kegan ............... 229/80 |
| 3,520,472 | A | * | 7/1970 | Kukulski ............... 229/80 |
| 3,906,844 | A | * | 9/1975 | Gougeon ............... 493/347 |
| 4,192,448 | A | | 3/1980 | Porth |
| 4,738,391 | A | * | 4/1988 | Wiseman ............... 229/80 |
| 4,790,670 | A | * | 12/1988 | Barbaro ............... 383/62 |
| 5,429,576 | A | | 7/1995 | Doderer-Winkler |
| 7,850,063 | B1 | * | 12/2010 | Boone ............... 229/83 |
| 2002/0164088 | A1 | * | 11/2002 | Collins ............... 383/10 |
| 2009/0001150 | A1 | | 1/2009 | Care |

\* cited by examiner

*Primary Examiner* — Nathan J Newhouse
*Assistant Examiner* — Peter Helvey
(74) *Attorney, Agent, or Firm* — St. Onge Steward Johnston & Reens LLC

(57) ABSTRACT

A resealable envelope is composed of a front panel and a rear panel attached to the front panel forming an interior pouch between the front panel and rear panel. A flap extends from the rear panel, the flap having an opening having an elongated width with two circular protrusions emanating from the top and bottom of the elongated width; the opening having a width greater than its height. A first adhesive has an adhesive layer on one side and a releasable surface layer an opposite side. The first adhesive is located at the top portion of the front panel such that the opening is in contact with the first adhesive when the flap is closed. A second adhesive strip is located on the outside of the flap over the opening such that the envelope is sealed when the flap is pressed against the resealable surface layer of the first adhesive.

17 Claims, 3 Drawing Sheets

CLEAR CLASP REUSABLE ENVELOPE

FIELD OF THE INVENTION

The present invention relates generally to a self-sealing system for use in an envelope. More specifically, to a reusable adhesive sealing system for use in envelopes that can be opened and resealed.

BACKGROUND OF THE INVENTION

Sealing systems in envelopes generally follow one of two types of systems. Single-use sealing systems and reusable sealing systems. Single-use sealing system, such as the one used to send folded 8.5" by 11" letters, generally includes a dried adhesive on the flap of the envelope. To seal the envelope the user applies a small amount of liquid to the adhesive, such as through the user licking the envelope, or through a sponge. The liquid mixes with the dried adhesive, activating the adhesive. The user then presses down on the flap, against the envelope, to seal the envelope.

Some envelopes include an adhesive that is not liquid activated. The adhesive is covered by a protective strip, generally made of plastic, which can be removed from the adhesive without affecting the strength of the adhesive. To seal the envelope, the user removes the protective strip from the adhesive and discards the strip. The user presses the flap firmly against the envelope to seal the flap to the envelope. While both of the above envelopes provide for an easy and cheap solution to sealing an envelope, neither method allows the envelope to be reused after its first use. The adhesive cannot be reused, and any attempt to open the envelope destroys the envelope, preventing it from being used again. To overcome this problem a metallic sealing system has been introduced.

In a metallic sealing system, the flap of the envelope includes a hole sized for two metallic protrusions to fit through. The envelope itself includes a metal clasp attached to the envelope with either an adhesive or with a metallic attachment to the envelope. The metal clasp has two metallic protrusions on opposite ends. Each metallic protrusion is flexible, and is capable of being deformed either flat against the envelope, or at any angle in relation to the envelope. To close the envelope, the user bends the two metal protrusions to an angle approximately perpendicular to the envelope. The envelope flap is closed against the envelope, as the two protrusions are inserted into the hole in the envelope. The two metal protrusions are then bent back towards the envelope, holding the envelope flap against the envelope, and providing a closure against anything falling out of the envelope.

While the above metal closure has been an easy system for opening and closing an envelope multiple times, this known closure has many problems associate with it. First, it is expensive to produce each envelope as the metal adds an extra cost, above a standard adhesive, and the attachment of the metal clasp to the envelope is more difficult than placing an adhesive on the envelope. Second, the metal clasp is subject to breakage after only a few folds of the clasp during the opening and closing of the envelope. Third, the United States Postal Service charges an extra fee per envelopes if the envelope includes a metal closure. Finally, an envelope closed with a metal clasp does not lie perfectly flat, making it more difficult to print on the envelope.

It is thus desirable to develop an envelope that can be opened and closed over and over again that is cheap to manufacture, cheap to print on, does not require a fee from the Post Office, and that is not subject to failure after only a few uses.

SUMMARY OF THE INVENTION

The invention is directed toward a reusable adhesive on an envelope that allows the envelope to be opened and sealed over and over again. The design allows for a cheap solution to a resealable envelope that is easy to manufacture and is not subject to failure.

Another object of the present invention is to provide a resealable envelope that does not require an extra fee to be mailed by the United States Post Office.

Still another object of the present invention is to provide a resealable envelope that can lay flat to make printing easier.

These and other objects of the present invention are achieved by provision of a resealable envelope having a front panel and a rear panel attached to the front panel forming a pouch between the front panel and the rear panel. A flap extends from the rear panel, the flap having an opening that is less than 1.5 inches wide and is shaped as a rectangle with rounded edges. The opening further has two circular protrusions from the top and the bottom of the elongated width; the height from the top circular protrusion to the bottom circular protrusion being less than 1 inch. A first adhesive has an adhesive layer on one side and a releasable surface on the opposite side; the first adhesive located at a top portion of the front panel such that the opening is in contact with the first adhesive when the flap is closed. A second adhesive covers the opening on the outside of the flap. The envelope is sealed when the flap is pressed against the front panel causing the second adhesive to adhere to the releasable surface layer of the first adhesive. The envelope can be sealed and unsealed a plurality of times without damaging the envelope.

In some of these embodiments the opening is located in the middle of the width of the envelope. In some of these embodiments the second adhesive is transparent. In certain of these embodiments the first adhesive is metallic in color. In certain of these embodiments the opening is shaped as a metal clasp from a standard metal clasp envelope. In some of these embodiments the second adhesive is less than 1.5 inches wide and 1 inch long.

In accordance with another embodiment of the present invention, an envelope comprises a front panel and a rear panel attached to the front panel forming an interior pouch between the front panel and the rear panel. A flap extends from the rear panel. The flap having an opening with and elongated width with two circular protrusions from the top and the bottom of the elongated opening. The elongated width being greater than the height including the two circular protrusions. A first adhesive strip has an adhesive on one side and a releasable layer on the opposite side. The first adhesive is located at the top portion of the front panel such that the opening is in contact with the first adhesive when the flap is closed. A second adhesive strip covers the opening, and the envelope is sealed when the flap is pressed against the front panel causing the second adhesive to adhere to the releasable surface layer of the first adhesive. The envelope can be sealed and unsealed a plurality of times without damaging the envelope.

In some of these embodiments the opening is located in the middle portion of the envelope. In some of these embodiments the second adhesive is transparent. In some of these embodiments the first adhesive is metallic in color. In certain of these embodiments the envelope is resealable. In certain of these embodiments the opening is shaped like a metal clasp from a standard metal clasp envelope. In certain of these embodiments the opening has a width between 0.75 inches and 3 inches. In certain of these embodiments the opening has a height between 0.5 inches and 1 inch.

In accordance with another embodiment of the present invention there is a method of manufacturing an envelope comprising the steps of placing a first adhesive on a top portion of a front panel of the envelope. Cutting an opening in the flap of the envelope, the flap extending from the rear panel of the envelope. Placing a second adhesive on an exterior portion of the flap covering the opening. Placing a protective strip over the on the front of the flap over the exposed portion of the second adhesive.

In some of these embodiments the envelope is resealable. In some of these embodiments the opening has an elongated width shaped as a rectangle with rounded edges, with two circular protrusions emanating from the top portion and the bottom portion of the elongated width; the opening having its width greater than its height. In certain of these embodiments the second adhesive is transparent. In certain of these embodiment the first adhesive is metallic in color and has a releasable surface layer. In some of these embodiments the opening is shaped like a metallic clasp from a standard metallic clasp envelope.

DETAILED DESCRIPTION OF THE INVENTION

Figure 1:
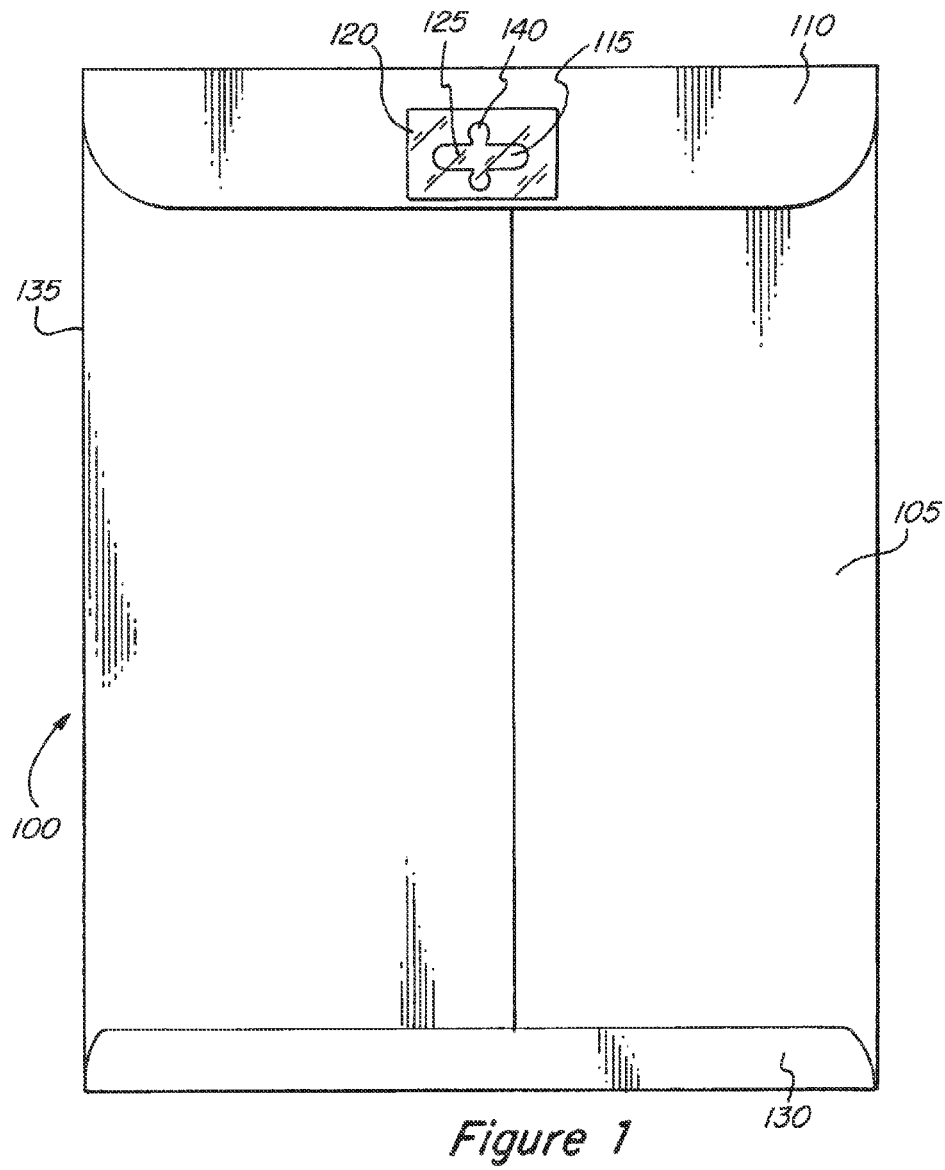
FIG. 1 is a view of an envelope according to the present invention in a closed position.

The exemplary embodiments of the present invention may be further understood with reference to the following description and the related appended drawings, wherein like elements are provided with the same reference numerals.

Referring first to FIG. 1 is an envelope 100. Envelope 100 can be of any standard such as A2, A6, A7, A8, A9, A10 No. 6¾, No. 7¾, No. 9. No. 10, No. 11, No. 12, No. 14 or any other standard size. Envelope 100 can further be any nonstandard or custom sized depending on the contents to be held in envelope 100. Envelope 100 includes a front panel 105 and a rear panel 305 (see FIG. 3). Front panel 105 and rear panel 305 are connected together at sides 135. A lower flap 130 is located at the bottom of rear panel 305 and extends off of rear panel 305 such that lower flap 130 can be folded over front panel 105 and sealed to front panel 105 forming an interior pouch between front panel 105, rear panel 305, and lower flap 130. Lower flap 130 is preferably less than 1 inch, however, lower flap 130 can be of any size. Lower flap 130 can be sealed with an adhesive tape or glue, and is preferably permanently sealed to prevent anything from falling out of envelope 100.

Rear panel 305 has an upper flap 110 extending from rear panel 305. Upper flap 110 is preferable under 2 inches in height, however, upper flap can be of any size. Upper flap 110 is folded over front panel 105 creating the upper closing portion of the interior pouch of envelope 100. Upper flap 110 includes an opening 115. Preferably opening 115 is shaped similar to the shape of a metal clasp in a standard metal clasp envelope. Opening preferable has an elongated with that is rectangular in shape with rounded edges instead of the standard 90 degree angles of the rectangle. Opening 115 has two protrusions 140 extending from the top and bottom of opening 115. The two protrusions are circular in shape and extend from approximately the middle of the width of opening 110. The two protrusions, while aesthetically reminding the user of standard metal clasp envelopes allows for an easier release of the upper flap from front panel 105, as will be described below.

Opening 115 is preferably less than 1.5 inches wide and 1 inch high. This size is similar to the size of a metal clasp in a standard metal clasp envelope. The center of opening 115 is located at the approximate center of the width of upper flap 110, and is located approximately ⅔ of the way down of the height of upper flap 110. While opening 115 has been described in detail above, it should be noted that opening 115 can be of any size and shape not limited to the embodiment above. Furthermore, opening 115 can be located at any place on flap 110 not limited to the middle of the width and ⅔ of the way down of the height.

Flap 110 has an adhesive strip 120 covering opening 115. Adhesive strip 120 can be square or rectangular, or of any regular or regular shape such that adhesive strip 120 covers the entire portion of opening 115. Adhesive strip 120 can even be of the same or substantially the same size and shape of opening 115 to make it more aesthetically pleasing. Adhesive strip 120 is preferably transparent or substantially transparent, and is colorless. Although adhesive strip 120 need not be transparent, and can be of any color. Adhesive strip 110 preferable has a removable protective plastic layer covering the portion exposed through opening 115. This protective layer protects adhesive 120 until envelope 100 is used for the first time.

Figure 2:
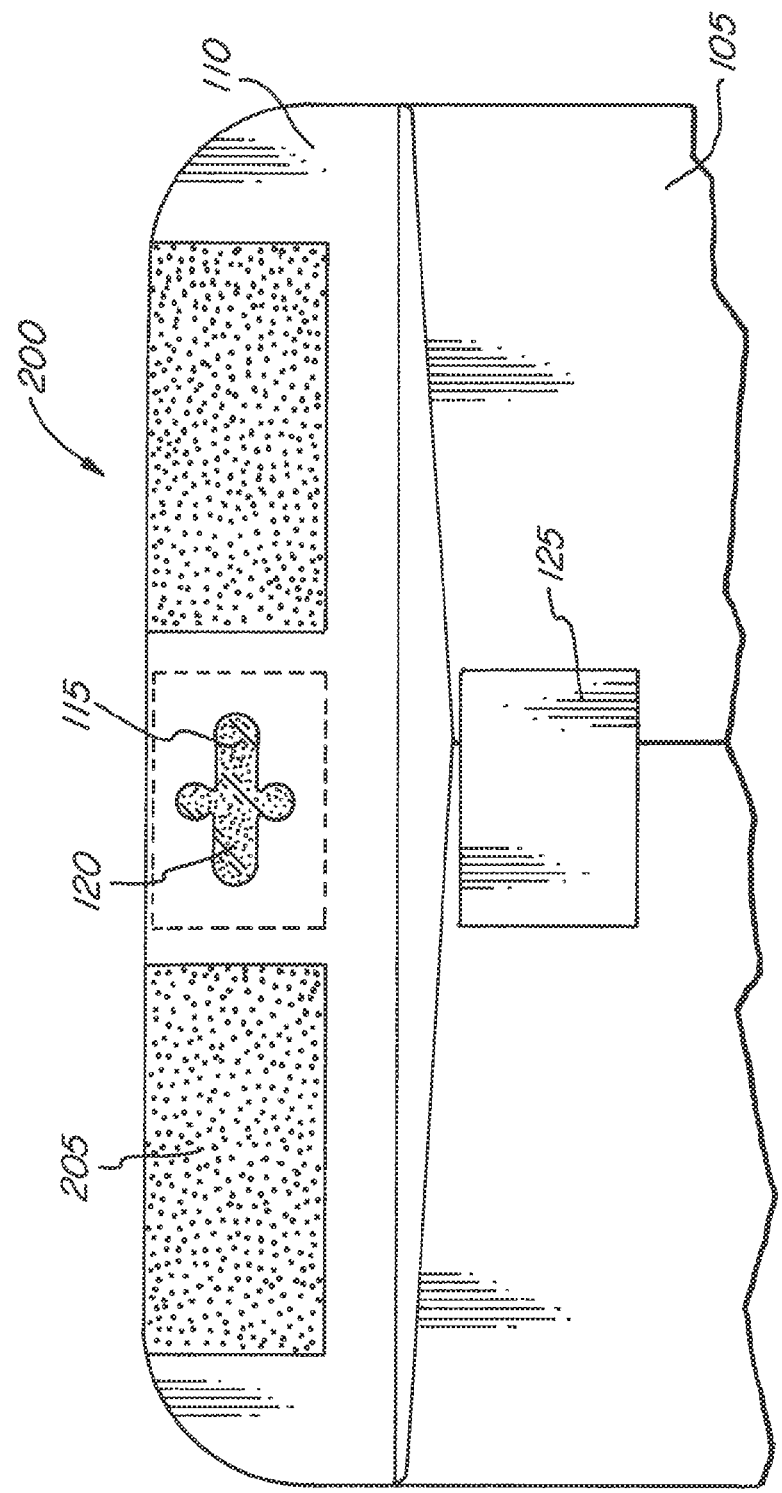
FIG. 2 is a view of an envelope according to the present invention in an open position.

Referring now to FIG. 2, envelope 100 contains a second adhesive strip 125 located on front panel 105. Adhesive strip 125 has an adhesive layer that is used to adhere adhesive strip 125 to front panel 105. Adhesive strip 125 has a releasable surface layer on the opposite side of the adhesive. The releasable surface layer is designed such that adhesive strip 120 can adhere to adhesive strip 125, however, the bond between adhesive strip 125 and front panel 105 is stronger than the bond created between adhesive strip 120 and the releasable surface layer of adhesive strip 125 such that adhesive strip 120 can be released from adhesive strip 125 without damaging envelope 100.

Envelope 100 further includes a third adhesive 205. Adhesive 205 is a dried adhesive, similar to dried adhesives on standard sealable envelopes. Dried adhesive 205 allows the user to convert resealable envelope 100 into a permanently sealed envelope. This allows the user to secure the contents of envelope 100 from anyone attempting to see what it is inside.

To seal envelope 100 the user presses flap 110 against front panel 105. Preferably pressing firmly over opening 115. Adhesive strip 120 comes in contact with adhesive strip 125 and the adhesive of adhesive strip 120 temporarily bonds to the releasable surface layer of adhesive strip 125. The bond between adhesive strip 120 and the releasable surface layer of adhesive strip 125 is strong enough to prevent the contents of envelope 100 from falling out if envelope 100 were flipped upside down. To unseal envelope 100 the user pulls up on flap 110, the force of which breaks the adhesive bond between adhesive strip 120 and the releasable surface layer of adhesive strip 125. As stated above, having circular protrusions emanating from opening 115 allows for easier release of adhesive strip 120 from adhesive strip 125 as the user initially only needs to overcome a small surface area of bond between the two adhesives to remove the entire adhesive strip. This makes sealing and unsealing the envelope significantly easier, and prolongs the life of the resealing elements as the wear and tear on the adhesive has a greater effect on the circular protrusion than on the main body of opening 115. This allows the main body of adhesive strip 120, located in opening 115, to maintain a greater bond between adhesive strip 120 and adhesive strip 125.

In a preferred embodiment adhesive strip 125 is metallic in color. This creates an aesthetically please look to the user as it reminds them of a standard metal clasp envelope. When the user seals envelope 100, the user sees the metallic color through the opening 115 since adhesive strip 120 is transparent. This reminds the user of a standard metal clasp envelope. However, adhesive strip 125 can be of any color, or can be transparent similar to adhesive strip 125.

Figure 3:
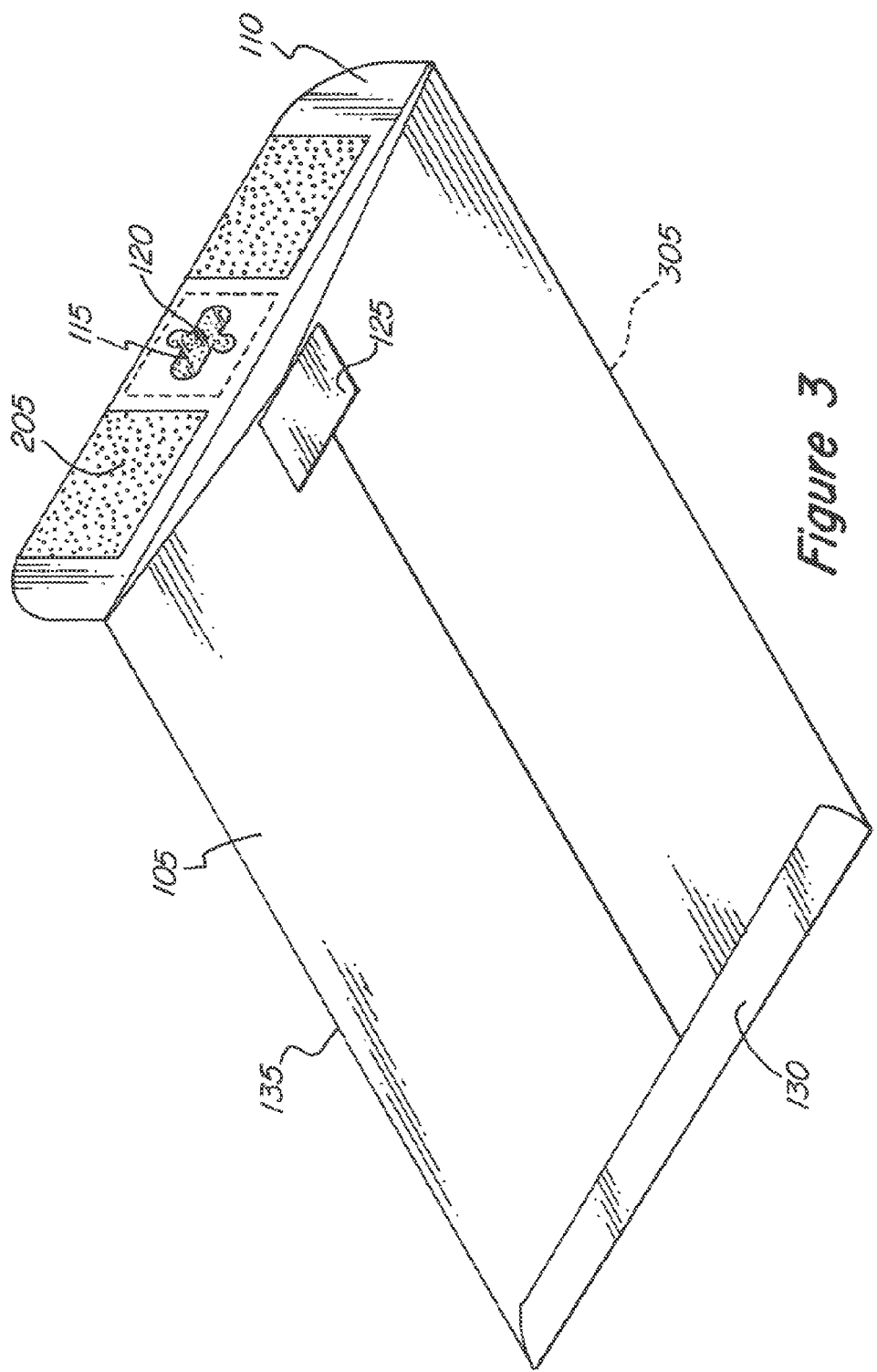
FIG. 3 is perspective view of an envelope according to the present invention in an open position.

Referring now to FIG. 3, a perspective view of envelope 100 is shown. Rear panel 305 can be seen connected to front panel 105 at the sides of front panel 105 and rear panel 305 forming an interior pouch.

To manufacture the resealable envelope, the manufacturer first folds a piece of paper into the desired envelope shape. The manufacturer then places an adhesive strip at the top portion of the front panel of the envelope. A hole is cut into the flap of the envelope, and a second adhesive is placed over the hole on the rear of the flap. Finally, a protective strip is placed on the front portion of the flap, covering the opening, protecting the envelope until its first use. While the steps above show an exemplary method of manufacturing a resealable envelope, it should be noted that the order of the steps above may be rearranged into any order. Further, the method of manufacture can be performed by a single machine or multiple machines to achieve the desired resealable envelope.

The present invention, therefore, provides a resealable envelope which uses an adhesive that bonds to a releasable surface layer of a second adhesive to allow the envelope to be sealed and unsealed over and over again.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A resealable envelope comprising:
   a front panel;
   a rear panel attached to said front panel forming a pouch between said front and said rear panel;
   a flap extending from said rear panel;
   an opening in said flap, wherein said opening is less than 1.5 inches wide and is shaped as a rectangle with rounded edges, and where said opening has two circular protrusions from a top and a bottom of said opening and a height of less than 1 inch;
   a first adhesive strip having an adhesive on one side and a releasable surface layer on an opposite side, said first adhesive strip located at a top portion of said front panel such that said opening is in contact with said first adhesive strip when said flap is closed;
   a second adhesive strip covering said opening, said second adhesive strip having an adhesive on one side, the second adhesive strip being placed over the opening on the exterior of said flap, the second adhesive strip being transparent;
   wherein said envelope is sealed when said flap is pressed against said front panel causing said second adhesive strip to adhere to said releasable surface layer of said first adhesive; and
   wherein said envelope can be sealed and unsealed a plurality of times without damaging said envelope.

2. The envelope of claim 1, wherein said opening is located in a middle portion of a width of said envelope.

3. The envelope of claim 1, wherein said first adhesive is metallic in color.

4. The envelope of claim 1, wherein said opening is shaped as a metal clasp from a standard metallic clasp envelope.

5. The envelope of claim 1, wherein the second adhesive strip a removable protective plastic layer covering the portion of the second adhesive strip exposed through the opening.

6. An envelope comprising:
   a front panel;
   a rear panel attached to said front panel forming an interior pouch between said front panel and said rear panel;
   a flap extending from said rear panel;
   an opening in said flap, said opening having an elongated width with two circular protrusions from a top and bottom portion of said elongated width, said opening having a width greater than a height;
   a first adhesive strip having an adhesive on one side and a releasable surface layer on an opposite side, said first adhesive strip being located at a top portion of said front panel such that said opening is in contact with said first adhesive when said flap is closed;
   a second adhesive strip on said flap covering said opening such that said envelope is sealed when said flap is pressed against said releasable surface layer,
   wherein said second adhesive strip has an adhesive on one side, said second adhesive strip being placed over the opening on the exterior of said flap.

7. The envelope of claim 6, wherein said opening is in a middle portion of said flap.

8. The envelope of claim 6, wherein said second adhesive is transparent.

9. The envelope of claim 8, wherein said first adhesive is metallic in color.

10. The envelope of claim 6, wherein said envelope is resealable.

11. The envelope of claim 6, wherein said opening has a width between 0.75 inches and 3 inches.

12. The envelope of claim 6, wherein said opening has a height between 0.5 inches and 1 inch.

13. The envelope of claim 6, wherein said opening is shaped as a metal clasp from a standard metallic clasp envelope.

14. A method of manufacturing a resealable envelope comprising the steps of:
   providing a resealable envelope having a front panel, a rear panel attached to said front panel forming an interior pouch between said front panel and said rear panel, and a flap extending from said rear panel;
   placing a first adhesive strip on a top portion of the front panel of the envelope, the first adhesive strip having an adhesive on one side and a releasable surface layer on an opposite side;
   cutting an opening in a flap of the envelope, the flap extending from a rear panel of the envelope, the opening having an elongated width with two circular protrusions from a top and bottom portion of said elongated width, said opening having a width greater than a height, and the opening being in contact with said first adhesive when said flap is closed;
   placing a second adhesive strip on an exterior of the flap covering the opening such that said envelope is sealed when said flap is pressed against said releasable surface layer, the second adhesive strip being transparent; and
   placing a protective strip over the opening on an interior of the flap.

15. The method of claim 14, wherein the opening has an elongated width shaped as a rectangle with rounded edges.

16. The method of claim 14, wherein the first adhesive is metallic in color and has a releasable surface layer.

17. The method of claim 14, wherein the opening is shaped as a metallic clasp in from standard metallic clasp envelope.

* * * * *